United States Patent
Hanselmann et al.

(10) Patent No.: US 11,803,732 B2
(45) Date of Patent: Oct. 31, 2023

(54) DEVICE AND METHOD FOR CLASSIFYING DATA IN PARTICULAR FOR A CONTROLLER AREA NETWORK OR AN AUTOMOTIVE ETHERNET NETWORK

(71) Applicant: Robert Bosch GmbH, Stuttgart (DE)

(72) Inventors: Markus Hanselmann, Stuttgart (DE); Holger Ulmer, Ulm (DE); Katharina Dormann, Heidelberg (DE); Thilo Strauss, Ludwigsburg (DE); Andrej Junginger, Stuttgart (DE); Jens Stefan Buchner, Bietigheim-Bissingen (DE); Sebastian Boblest, Duernau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 621 days.

(21) Appl. No.: 16/742,353

(22) Filed: Jan. 14, 2020

(65) Prior Publication Data
US 2020/0234101 A1 Jul. 23, 2020

(30) Foreign Application Priority Data
Jan. 17, 2019 (DE) .......................... 102019200565.9

(51) Int. Cl.
*G06N 3/08* (2023.01)
*G06N 3/044* (2023.01)

(52) U.S. Cl.
CPC .............. *G06N 3/044* (2023.01); *G06N 3/08* (2013.01)

(58) Field of Classification Search
CPC ................... G06N 3/0445; G06N 3/08; H04L 2012/40215; H04L 2012/40273; H04L 12/40; H04L 63/1425; H04L 63/1416; H04L 41/145; H04L 41/147
See application file for complete search history.

(56) References Cited

U.S. PATENT DOCUMENTS

| | | | |
|---|---|---|---|
| 2003/0172292 A1* | 9/2003 | Judge ..................... | G06F 21/577 726/23 |
| 2006/0123479 A1* | 6/2006 | Kumar ................ | H04L 63/0245 726/23 |
| 2007/0043539 A1* | 2/2007 | Niina .................. | G05B 23/0221 702/188 |
| 2018/0262327 A1* | 9/2018 | Jain ........................... | H04L 9/12 |
| 2018/0337938 A1* | 11/2018 | Kneib ..................... | H04W 4/48 |
| 2020/0067861 A1* | 2/2020 | Leddy .................. | G06F 21/6245 |
| 2020/0285939 A1* | 9/2020 | Baker ....................... | G06N 7/01 |

* cited by examiner

*Primary Examiner* — Khoi V Le
(74) *Attorney, Agent, or Firm* — NORTON ROSE FULBRIGHT US LLP; Gerard Messina

(57) ABSTRACT

A device and a computer-implemented method for classifying data, in particular for a Controller Area Network or an automotive Ethernet network. A plurality of messages is received from a communications network. A message that has a predefined message type is selected for an input variable for an input model of a plurality of input models of an artificial neural network associated with the predefined message type. The input variable is determined as a function of the message, and in an output area of the artificial neural network a prediction is output that is usable for classifying the message as a function of the input variable, or a reconstruction of an input variable is output that is usable for classifying the message as a function of this input variable.

29 Claims, 4 Drawing Sheets

| Timestemp | ID | DLC | Byte0 | Byte1 | Byte2 | Byte3 | Byte4 | Byte5 | Byte6 | Byte7 |
|---|---|---|---|---|---|---|---|---|---|---|
| 0.0001 | B | 8 | A6 | 00 | 2D | 13 | F1 | 2C | A4 | 70 |
| 0.0003 | A | 8 | B7 | 2B | 26 | C1 | 20 | 10 | 00 | 00 |
| 0.0004 | C | 8 | 2A | 54 | BA | 11 | 17 | AF | 18 | C2 |
| 0.0006 | A | 8 | CB | 26 | 26 | C2 | 00 | 10 | 00 | 30 |
| 0.0007 | B | 8 | 6F | 32 | 2D | 13 | 21 | 2C | A2 | 00 |
| 0.0008 | A | 8 | DA | 2B | 26 | 23 | 00 | 00 | 02 | 00 |
| 0.0011 | A | 8 | 12 | 2B | 26 | C4 | 00 | 10 | 00 | 00 |
| 0.0012 | C | 8 | 3A | F4 | 2A | 1A | 24 | AF | 28 | C3 |
| 0.0013 | B | 8 | 93 | 03 | 23 | 13 | E1 | 2C | 25 | 00 |
| 0.0015 | A | 8 | F0 | 2B | 26 | C5 | 00 | 00 | 00 | 40 |
| ... | | | | | | | | | | |

DEVICE AND METHOD FOR CLASSIFYING DATA IN PARTICULAR FOR A CONTROLLER AREA NETWORK OR AN AUTOMOTIVE ETHERNET NETWORK

CROSS REFERENCE

The present application claims the benefit under 35 U.S.C. § 119 of German Patent Application No. DE 102019200565.9 filed on Jan. 17, 2019, which is expressly incorporated herein by reference in its entirety.

BACKGROUND INFORMATION

In vehicles, data are exchanged between control units via a Controller Area Network or an Ethernet network.

It is desirable to reliably recognize anomalies in the data exchanged via such a network.

SUMMARY

A Controller Area Network in particular according to the ISO 11898 standard family is installed in many vehicles. This network is referred to below as a CAN. A CAN is a serial field bus system that allows communication by microcontrollers, in particular control units, via a CAN bus in the vehicle. The data traffic on the CAN bus may be basically subdivided into two groups:

Normal Behavior:

Normal behavior describes the type of data that occur during normal operation, i.e., without errors, failures, external manipulations, or the like. In a correctly operating system, only error-free data occur, and the individual data are generally a function of one another via specific (steady-state as well as temporal) correlations.

Anomalies:

For various reasons, deviations from normal behavior, referred to below as anomalies, may occur in the data of the CAN during actual operation. The following are examples of possible causes:

(i) defects or total failure of the CAN subsystems or of the vehicle provide incorrect data or no data at all, (ii) components of the CAN or of the vehicle are damaged, (iii) the system has been manipulated by an external source such as a hacker attack, referred to below as an intrusion.

For automotive Ethernet networks in particular according to one of the standards from the IEEE 802.3 standard family, which may be used in addition to or instead of CAN, the same subdivision is made in the following discussion.

For the safe operation of vehicles in particular, it is very important to recognize such anomalies in this type of data. The data are transmitted in messages via the network. These messages are subdivided into message types of the communication type used. For example, in a CAN a message type is associated with each CAN ID.

Monitoring network traffic using machine learning methods, in particular artificial neural networks with the aid of deep learning, for example, represents a major challenge due to the high degree of variability in the data. Thus, for a CAN, for example, it is not predefined which messages, with which CAN IDs, follow one another. The order in which messages with the CAN IDs are transmitted depends not just on their cycle time, but also on many other factors, such as the point in time at which the associated control unit is ready to transmit during the starting operation of the vehicle, whether up-to-date messages with CAN IDs are transmitted with a higher priority, or also the transmission rate of the CAN bus. This results in a highly dynamic, complex time curve of the data flow. In addition to this temporal variability, there is also a high degree of variability in the data themselves, which contain the messages. Thus, messages with different CAN IDs include different numbers of signals.

The data variability becomes even more significant when one considers in particular an automotive Ethernet, in which different protocol types that vary greatly in their data structure must be dealt with.

For the use of artificial neural networks for network data, basically two problems arise: On the one hand, the temporal variability makes it problematic to use recurrent artificial neural networks, which are suited in particular for use with chronologically ordered data in particular, since it is very difficult for such networks to learn the chronological sequence of messages with different CAN IDs due to the fact that this sequence, although valid in each case, may be structured very differently. On the other hand, artificial neural networks expect the same data structure for each input of data.

In one aspect of the present invention, a computer-implemented method for classifying data in particular for a Controller Area Network or an automotive Ethernet network is provided, a plurality of messages being received from a communications network, a message that has a predefined message type being selected for an input variable for an input model of a plurality of input models of an artificial neural network associated with the predefined message type, the input variable being determined as a function of the message, in an output area of the artificial neural network a prediction being output that is usable for classifying the message as a function of the input variable, or a reconstruction of an input variable being output that is usable for classifying the message as a function of this input variable. Due to this architecture of the artificial neural network that is specifically tailored for network traffic in the monitored communications network, the problem of temporal variability as well as data-specific variability is solved. Instead of being limited to selecting only a few of the received messages for which the artificial neural network is trained overall, a message, as a function of its message type, is associated with an input model that is specified for this message type. The artificial neural network, in particular for the input model, may thus be kept comparatively small. This is of interest in particular for the use of embedded devices. An improved intrusion detection system may be built and/or configured with the aid of the neural network architecture. An intrusion detection system is referred to below as "IDS." The provided method may be trained without monitoring; i.e., for the training it is only necessary for a sufficient amount of normal data to be present, but without any anomalies or intrusions. However, the trained system is still able to detect new, previously unknown anomalies. Compared to a rule-based IDS, this results in the advantage that the system may automatically learn possibly latent relationships of the network traffic, based on the training data. This greatly hinders or prevents an attacker from successfully attacking the system, since the attacker would also have to map the functional relationships of the system during the attack in order to spoof the IDS. For example, whenever a relevant message type is transmitted in the network, it is propagated by the artificial neural network. For each time increment, this allows a prediction to be computed, and thus, anomalies to be recognized in real time.

It is advantageously provided that the artificial neural network is trained to allow, as a function of at least a portion of network traffic in the communications network, a decision to be made concerning in which state out of a plurality of possible states the communications network is in with a higher probability compared to the other possible states. This allows an efficient classification into one of many possible states. For example, in the method a neural network is used which, based on network traffic, allows a decision to be made concerning in which of the states the network is in. Such a classification problem is easily learned in this neural network architecture by adapting the output area to the classification problem and applying a suitable loss function in the training. The method using this neural network architecture is suited not only for an IDS, but also for many other applications that may be used when dealing with network traffic. For example, preemptive maintenance is one possible field of application for the method using this network architecture.

It is advantageously provided that a plurality of messages is selected as an input variable for a plurality of input models as a function of a plurality of predefined network types, a message type being unambiguously associated with one of the plurality of input models, outputs of the plurality of input models being aggregated as an input for the output area. This allows selective data preprocessing as a function of the message type.

It is advantageously provided that states of the plurality of input models are aggregated, in particular by concatenation of the states into a vector. This aggregation is particularly efficient.

It is advantageously provided that a first input variable is selected for a first time increment, a prediction for a second input variable being determined as a function of the first input variable, an anomaly being recognized, based on a result of a comparison of the second input variable and the prediction, when the result satisfies a criterion that defines an anomaly. It may be provided in particular that further variables in addition to the first and the second input variables may be included in the computation of whether an anomaly is present, for example preceding comparisons of a prediction and the particular second input variable. Anomalies are thus reliably recognizable independently of a rule-based IDS.

It is advantageously provided that the result is defined as a function of a measure for a deviation of the prediction from the second input variable, the criterion being defined by a threshold value for the deviation, an anomaly being recognized when the measure for the deviation exceeds the threshold value. This increases the robustness of the anomaly recognition.

A corresponding device for classifying data in a communications network, in particular for a Controller Area Network or an automotive Ethernet network, includes an artificial neural network, the artificial neural network including an input model for an input variable and an output area, the device including a selection device that is designed to select a message from the communications network, having a predefined message type, for the input variable, and the output area being designed to output a prediction that is usable for classifying the message as a function of the input variable, or for outputting a reconstruction of an input variable that is usable for classifying the message as a function of this input variable. This device is specifically tailored for network traffic in the communications network.

The artificial neural network may thus be kept comparatively small. The device is designed in particular for use on an embedded device.

It is advantageously provided that the artificial neural network of the device is trained to allow, as a function of at least a portion of network traffic in the communications network, to make a decision concerning in which state out of a plurality of possible states the communications network is in with a higher probability compared to the other possible states. This allows versatile use of the device.

It is preferably provided that the device includes a plurality of input models, an aggregation section that is designed in particular as an artificial neural network being situated between the plurality of input models and the output area, and being designed to aggregate outputs of the plurality of input models as an input for the output area. The device thus provides a versatile interface for data preprocessing of a plurality of message types in different input models, whose output is jointly used for the classification.

It is preferably provided that the aggregation section is designed to aggregate states of the plurality of input models, in particular by concatenation of the states into a vector. This represents a particularly effective combination of the information of the input models, in particular in an embedded device having limited computing resources.

It is preferably provided that the selection device is designed to select a first input variable for a first time increment, the output area being designed to determine, as a function of the first input variable, a prediction for a second input variable, a comparator being designed, based on a result of a comparison of the second input variable and the prediction, to recognize an anomaly when the result satisfies a criterion that defines an anomaly. The device thus recognizes anomalies in a particularly efficient manner.

It is preferably provided that the result is defined as a function of a measure for a deviation of the prediction from the second input variable, the criterion being defined by a threshold value for the deviation, the device being designed to recognize an anomaly when the measure for the deviation exceeds the threshold value. The measure may also be a function of other variables. The anomaly recognition by the device is thus particularly robust.

The training method for an artificial neural network for classifying data, in particular for a Controller Area Network or an automotive Ethernet network, using training data that include a plurality of messages of different message types provides that a message having a predefined message type is selected for a first input variable for an input model of a plurality of input models of the artificial neural network associated with the predefined message type, the first input variable being determined as a function of the message, in an output area of the artificial neural network a prediction being output that is usable for classifying the message as a function of the first input variable, a second input variable being determined from the training data, an error measure being determined as a function of the second input variable and the prediction, and a backpropagation step being carried out, parameters of the artificial neural network corresponding to the optimization strategy being determined as a function of the error measure, or a reconstruction of an input variable being output that is usable for classifying the message as a function of this input variable, an error measure being determined as a function of the first input variable and the reconstruction, and a backpropagation step being carried out, parameters of the artificial neural network corresponding to the optimization strategy being determined as a function of the error measure. This machine learning approach operates with a large quantity of messages, for example CAN signals. In particular, it is not necessary to be limited to preselecting a few messages, for example CAN signals, from the trace.

It is preferably provided that a plurality of messages is selected as a function of a plurality of predefined message types as an input variable for a plurality of input models, a message type being unambiguously associated with one of the plurality of input models, outputs of the plurality of input models being aggregated as an input for the output area. This machine learning approach operates with input models that are unambiguously associated with a certain message type.

It is preferably provided that states of the plurality of input models are aggregated, in particular by concatenation of the states into a vector or tensor. This allows particularly efficient computation of the predictions in the training.

It is preferably provided that the first input variable is selected for a first time increment, the prediction for the second input variable being determined for a second time increment as a function of the first input variable, the error measure being determined as a function of the second input variable and the prediction for the second time increment. The artificial neural network is thus trained in a particularly effective manner with regard to deviations of the messages from the prediction.

Alternatively, it may be provided that a plurality of input models aggregate data over multiple time increments, and in particular an evaluation step takes place in the output area with prior preprocessing, the prediction being determined. The alternative may be of interest, for example, when only limited resources are available and the comparatively costly, i.e., computing time- or computing resource-intensive, step of the aggregation and of the output section is not to be carried out very often.

It is preferably provided that the first input variable is selected for a first time increment, the reconstruction for the first input variable being determined for the first time increment as a function of the first input variable. The artificial neural network is thus trained in a particularly effective manner with regard to deviations of the messages from the reconstruction.

Alternatively, it may be provided that a plurality of input models aggregate data over multiple time increments, and in particular an evaluation step takes place in the output area with prior preprocessing, the reconstruction being determined. The alternative may be of interest, for example, when only limited resources are available.

It is preferably provided that the training takes place without monitoring, in particular only with the aid of data that define normal behavior of the communications network. An intrusion detection system that results from this training is configured using only data that describe the normal behavior. Deviations from this normal behavior are classified as an attack by this intrusion detection system, as the result of which the system is also able to detect unknown attacks.

Further advantageous embodiments of the present invention result from the following description and the figures.

DETAILED DESCRIPTION OF EXAMPLE EMBODIMENTS

Figure 1:
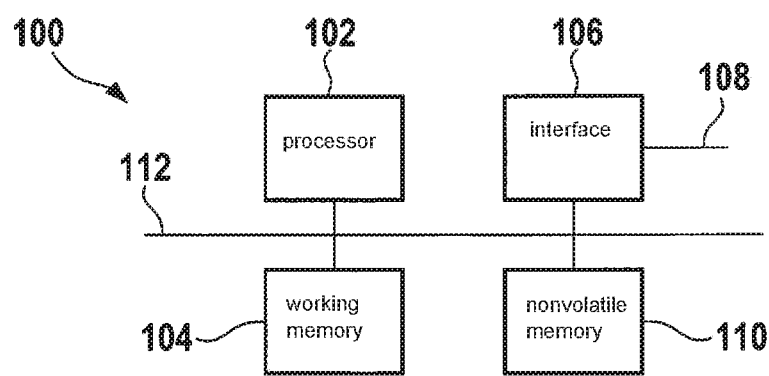
FIG. 1 shows a schematic illustration of portions of a device for classifying data.

FIG. 1 schematically illustrates a device 100 for classifying data.

Device 100 is an embedded device in the example. Device 100 includes a processor 102, a working memory 104, an interface 106 for a communications network 108, and a nonvolatile memory 110. These are designed to communicate via a bus 112 or some other data line.

Figure 2:
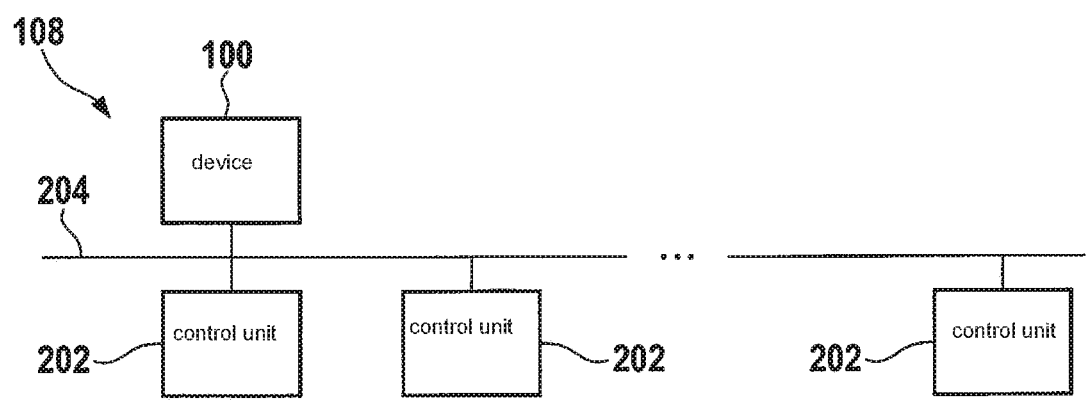
FIG. 2 shows a schematic illustration of portions of a communications network.

FIG. 2 schematically illustrates portions of communications network 108, in which device 100 and multiple control units 202 are situated on a data line 204. Data line 204 is a CAN bus in the example, but may additionally include an automotive Ethernet connection, or alternatively may be an automotive Ethernet connection.

Figure 3:
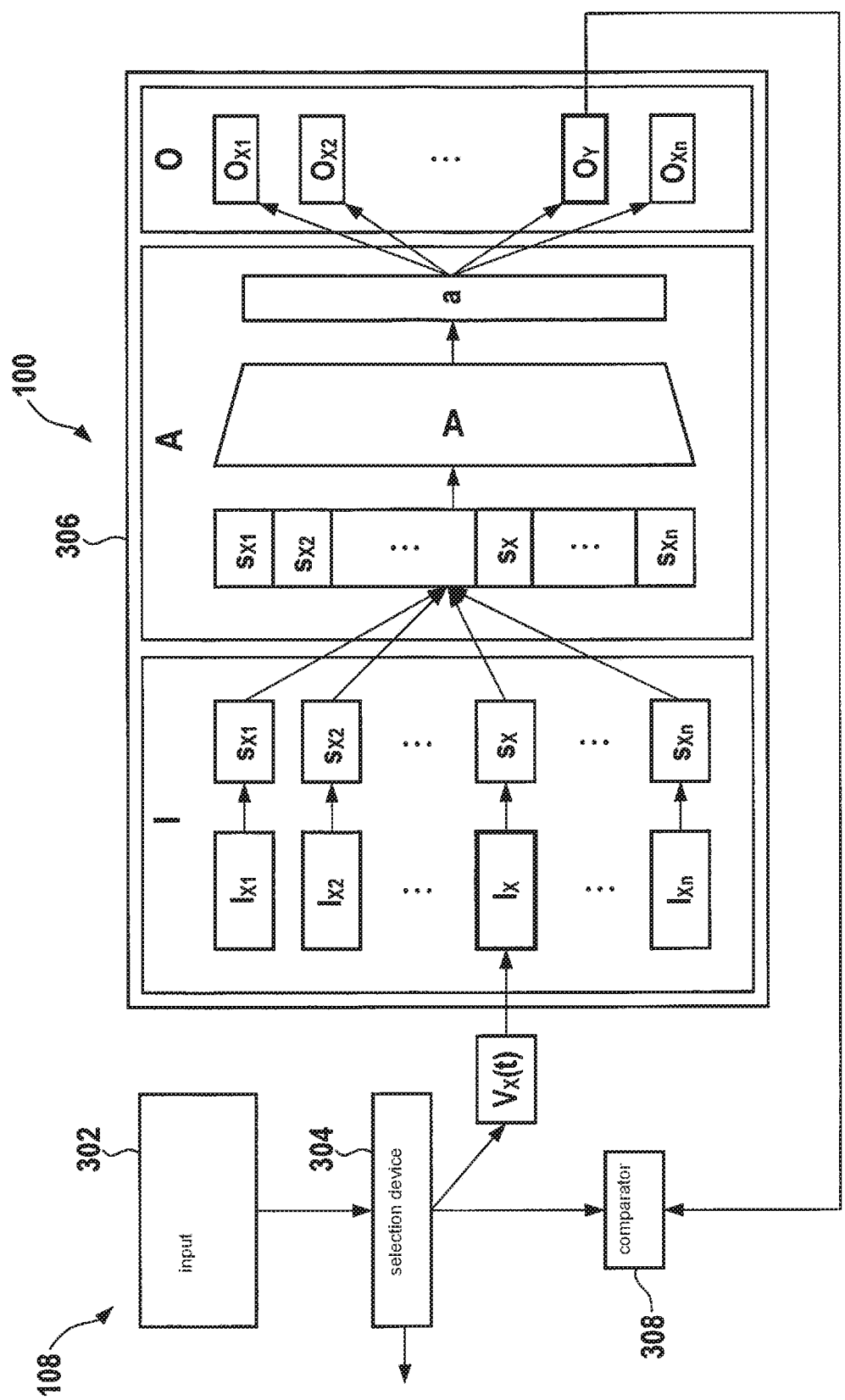
FIG. 3 shows a schematic illustration of a flow chart and a neural network architecture.

FIG. 3 depicts a schematic illustration of a flow chart and a neural network architecture. This is based on a CAN, but is correspondingly also applicable for an automotive Ethernet. Device 100 is designed to classify data in communications network 108, in particular for a CAN or an automotive Ethernet network.

Device 100 includes an input 302 for one message or multiple messages from communications network 108. In the example, a CAN trace is provided at the input.

A CAN trace contains a plurality of messages of different message types that are distinguishable based on their CAN ID. An example of a CAN trace is illustrated in FIG. 4.

Figures 4, 5:
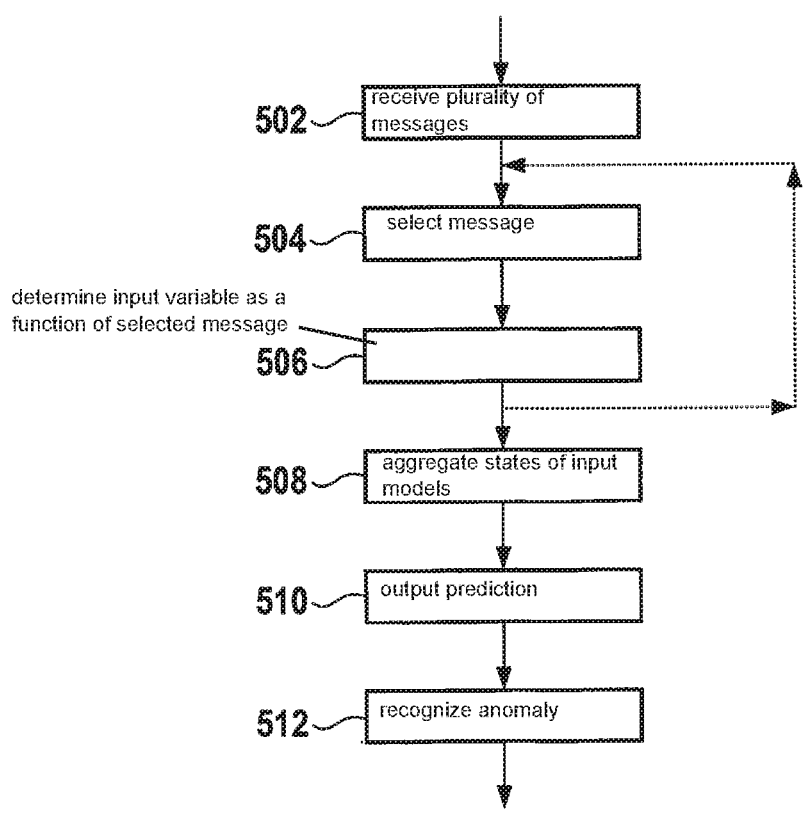
FIG. 4 shows a schematic illustration of a CAN trace.
FIG. 5 shows a schematic illustration of a method for classifying data.

FIG. 4 schematically illustrates a chart of a CAN trace. The chart illustrated in FIG. 4 contains important, but not all possible, contents, of a CAN trace. The data containing a message are situated in one row in FIG. 4. In particular, at each point in time, denoted by a time stamp in FIG. 4, at which a message, i.e., a CAN frame, is received, an identifier of this message, the CAN ID, denoted by reference symbol ID in FIG. 4 is transmitted. In addition, a so-called payload is transmitted, which in this example is made up of eight bytes that are hexadecimally encoded. The data length code, denoted by reference symbol DLC in FIG. 4, indicates the length of the message.

Message types A, B, C to be recognized via their CAN ID are provided in FIG. 4.

Device 100 includes a selection device 304 that is designed to recognize a message based on its message type and to associate it with data preprocessing, described below. Selection device 304 is designed to select a message from communications network 108, having a predefined message type X, for a first input variable $v_X$.

For each CAN ID, in the example different numbers of signals may be encoded in the eight bytes of the payload. Which bits, and how they are combined into these signals, are extractable from a data base CAN file, known as a DBC file. During the data preprocessing, for example a subset of the signals or all of the signals is/are extracted from the payload, and possibly normalized or further processed in some other way. In addition to, the signals, further pieces of information may be extracted from the CAN frame. For example, the time stamp is suitable for being transformed as an input variable for the neural network, or as an identifier of the bus on which the message is transmitted. It is likewise possible to use the bytes directly as input variables.

For other network types for which there are categorical data, such as a media access control address, known as a MAC address, these may be preprocessed, for example, via "one-hot encoding" or some other suitable encoding.

For each CAN ID, or in general for each transmitted message type of communications network 108, a data preprocessing step is thus defined, so that for a message type X, for each time increment t at which message type X is observed, an input vector $v_X(t)$ is established that is made up of numerical values and whose dimensionality is the same for each time increment at which X occurs.

A new time increment t+1 follows time increment t, for example, whenever a new message is received on communications network 108. If a CAN trace is already present that contains multiple messages, the time stamp indicates the order in which the messages were received on communications network 108.

A separate input model is used for each message type X. This approach solves the problem of high data variability. It is optionally possible to consider only a subset of all message types X that occur.

In the following discussion, reference symbol N denotes the set of all relevant message types X, and reference symbol n denotes the number of its elements.

Device 100 includes an artificial neural network 306. Artificial neural network 306 includes an input area I, an optional aggregation section A, and an output area O.

An overview of the network architecture of one example of a model is described below.

In the example, an input model $I_X$ is used for all $X \in N$. $v_X(t)$ is fed into input model $I_X$ as an input only if message type X is observed in the network traffic at time increment t. This approach solves the problem of the high temporal variability of network data.

If $I_X$ is implemented via a recurrent neural network structure, for example, this allows the internal status of the network to be updated only when the particular ID actually occurs.

For anomaly recognition, it is provided that, at any time increment t, overall network M is able to make a prediction $v_X'(t+1)$ for $v_X(t+1)$ for all $X \in N$.

Alternatively, it may be advantageous to make a prediction only for a subset of the values. The network architecture is thus adaptable in a problem-specific manner.

For the prediction, the artificial neural network is designed in such a way that it is possible to use the outputs from all input networks I. This has the advantage that all internal states may be used for the prediction, as the result of which functional dependencies are also incorporated into the prediction.

At time increment t+1 a check is made as to which message type X has actually been transmitted.

If this is $X \in N$, prediction $v_X'(t+1)$ is compared to actual value $v_X(t+1)$.

A deviation between prediction $v_X'(t+1)$ and actual value $v_X(t+1)$ is included in an error measure. In the example, the error measure is used to compute an anomaly score.

Artificial neural network 306 includes at least one input model $I_X$ in input area I. Input model $I_X$ is associated with first input variable $v_X$. In the example, first input variable $v_X$ represents a message in communications network 108 that contains data to be classified. First input variable $v_X$ encodes the data of the message in the example as a vector.

In the example, a plurality of message types, a plurality of input variables $v_{X1}, \ldots, v_{Xn}$, and a plurality of input models $I_{X1}, \ldots I_{Xn}$ are provided. In the example, these are unambiguously associated with different input variables, as a function of their message type, by selection device 304.

In the example, an instantaneous state $s_X$ of input model $I_X$ is transferred to optional aggregation section A as an input $s_X$. More precisely, the plurality of instantaneous states $s_{X1}, \ldots s_{Xn}$ of the plurality of input models $I_{X1}, \ldots I_{Xn}$ is transferred to aggregation section A. From the plurality of states $s_{X1}, \ldots s_{Xn}$, aggregation section A generates an output a as an input of output area O. In the example, output a is a vector that is generated by concatenation of the plurality of instantaneous states $s_{X1}, \ldots s_{Xn}$.

It may also be provided that aggregation section A further processes the plurality of instantaneous states $s_{X1}, \ldots s_{Xn}$ as needed, optionally via a neural network structure.

Instead of the aggregation, it may also be provided to use the plurality of instantaneous states $s_{X1}, \ldots s_{Xn}$ directly as an input for output area O.

Artificial neural network 306 includes at least one output model $O_Y$ in output area O. The task of output model $O_Y$ is to determine a prediction $v_Y'(t+1)$ for $v_Y(t+1)$ at each point in time t in order to compare this prediction to $v_Y(t+1)$ when a message type Y occurs at point in time t+1. In the example, there is an output model $O_{X1}, \ldots O_{Xn}$ in each case for the plurality of input variables $v_{X1}, \ldots v_{Xn}$. In the example, output model $O_X$ is unambiguously associated with first input variable $v_X$. More precisely, the plurality of output models $O_{X1}, \ldots O_{Xn}$ is unambiguously associated with the plurality of input variables $v_{X1}, \ldots v_{Xn}$.

Output area O is designed to output a prediction $v_X'$ for classifying the message as a function of first input variable $v_X$. Output area O delivers a prediction for the next time increment, based on the data delivered by aggregation section A.

Output model $O_Y$ at point in time t represents a prediction $v_Y'(t+1)$ for a second input variable $v_X(t+1)$ that follows input variable $v_X(t)$.

In the evaluation of a time increment t, a forward propagation of an input is provided in an evaluation phase and also in a training phase.

In the simplest specific embodiment, the plurality of input models $I_{X1}, \ldots I_{Xn}$ of input area I are implemented as recurrent neural networks, for example via long short-term memories (LSTMs), gated recurrent units (GRUs), vanilla recurrent neural networks (RNNs), or continuous-time RNNs.

In principle, any freedoms with regard to the design of the network architecture are provided. For example, deep artificial neural networks may be used, and different architectures of any type may also be used for various message types as needed. The wide variety of network architectures may be used here. As input, input model $I_X$ obtains input variable $v_X$ in a form that is processable according to the specification of input model $I_X$ in order to generate output $s_X$.

The dimensionality of output $s_X$ is freely specifiable for each input model $I_X$. Output $s_X$ of input model $I_X$ is stored during a time increment t. In the event that simple LSTMs are used for input model $I_X$, this is the so-called "hidden state," usually referred to as $h_t$ in the literature.

In the example, $s_X$ also refers to the instantaneous state of input model $I_X$. After input model $I_X$ has updated state $s_X = s_X(v_X(t))$ at a time increment t and after the occurrence of a message X, aggregation section A aggregates instantaneous states $s_X$ from all $X \in N$.

Further processing may optionally take place, for example, by feeding the data aggregated in this way to an artificial neural network. Output a of aggregation section A is a vector or tensor, for example, which in the example has the same dimensionality at each point in time. Regardless of which message type occurs at instantaneous time increment t or the last time that the other message types have occurred, output a, i.e., the vector or tensor, thus contains pieces of information concerning all instantaneous states of the individual message types.

The task of output area O is to provide prediction $v_X'(t+1)$ at time increment t for each $X \in N$, in particular for all previously determined relevant variables, that indicates what the model expects if message type X should occur at time increment t+1.

Many different network architectures may be applied to achieve this. To obtain a preferably streamlined artificial neural network architecture, for example for each $X \in N$ a dedicated output model $O_X$ is used. In the simplest case, this may be implemented as a fully connected, in particular deep, artificial neural network. The neural network architecture here may also have a separate design as needed, and optionally for each message type.

Output model $O_X$ receives output a of aggregation section A as an input. In the example, as output, output model $O_X$ generates a vector $o_X = v_X'(t+1)$ that has the same structure as $v_X(t)$.

The subdivision into a plurality of output models $O_{X1}, \ldots O_{Xn}$ is only one of many possible implementations of output area O. This has the advantage that on the one hand it manages with preferably few parameters, and on the other hand rapid evaluation is thus also made possible. It is also conceivable, for example, to feed output a into a single neural network and generate the desired output of output area O.

In one aspect, device 100 includes a comparator 308. Comparator 308 is designed to recognize an anomaly based on a result of a comparison of second input variable $v_X(t+1)$ and prediction $v_X'(t+1)$ when the result satisfies a criterion that defines an anomaly. Further parameters, in particular also prior deviations, may be incorporated into the computation of the criterion.

In the example, selection device 304 is designed to select first input variable $v_X$ at a first time increment t. In this example, output area O is designed to determine prediction $v_Y'(t+1)$ for second input variable $v_Y(t+1)$ as a function of first input variable $v_X$. When a message having message type X is followed by a message having message type Y, in the example a prediction for the message having message type Y, i.e., the prediction $v_Y'$ for second input variable $v_Y(t+1)$, is determined with the aid of first input variable $v_X$. In this example, comparator 308 is designed to recognize an anomaly, based on a result of a comparison of second input variable $v_Y(t+1)$ and prediction $v_Y'(t+1)$, when the result satisfies a criterion that defines an anomaly. The result is defined, for example, as a function of a measure for a deviation of prediction $v_Y'(t+1)$ from second input variable $v_Y(t+1)$. The criterion is defined, for example, by a threshold value for the deviation. In this example, an anomaly is recognized when the measure for the deviation exceeds the threshold value.

In another aspect, artificial neural network 306 may be trained to decide, based on at least a portion of network traffic in communications network 108, in which state out of a plurality of possible states communications network 108 is in with a higher probability compared to the other possible states. In this case, the prediction of the output area concerns these states.

Figure 6:
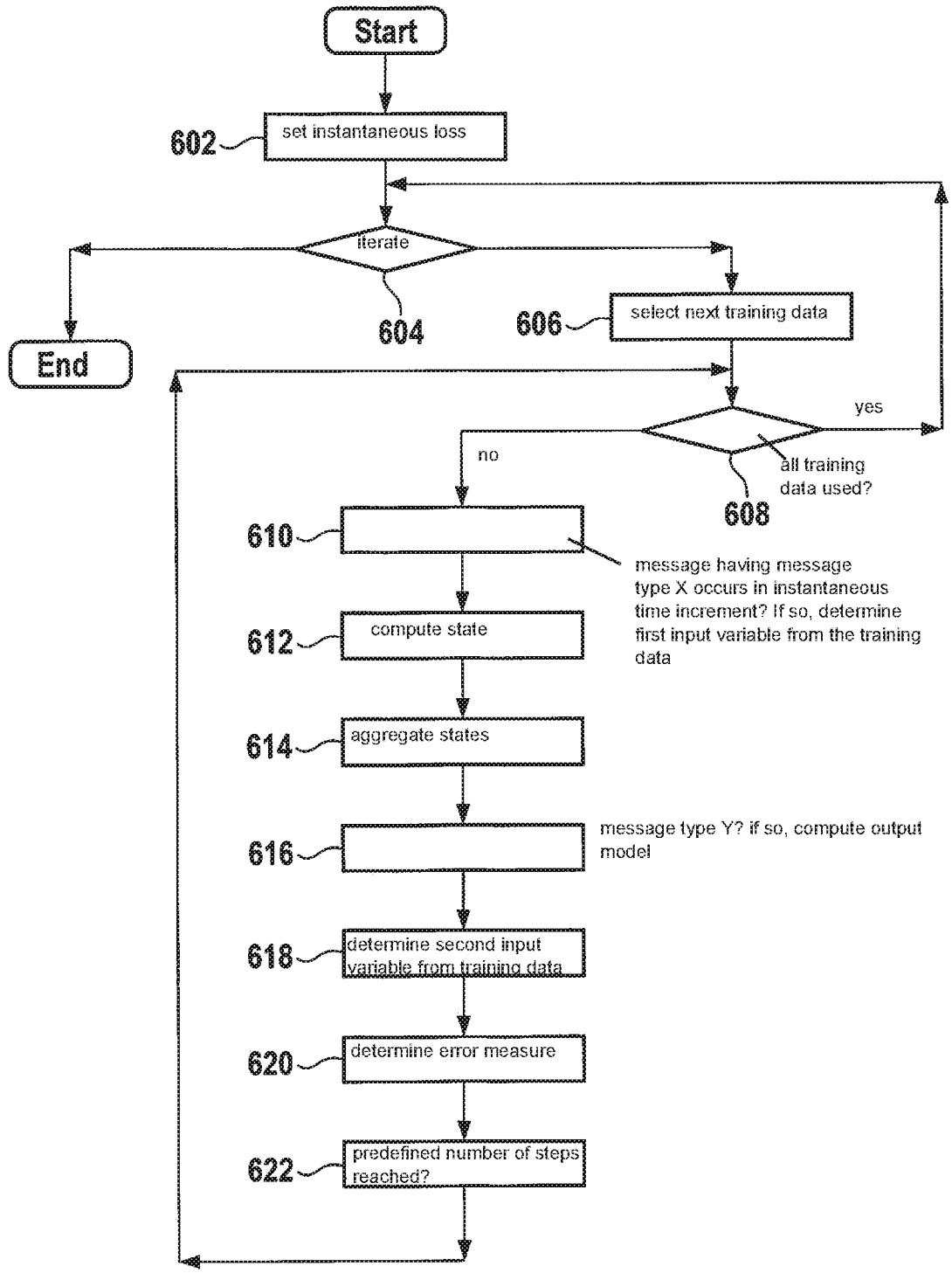
FIG. 6 shows a schematic illustration of a training method.

Instructions are stored on nonvolatile memory 110, and when executed by processor 102 a method for classifying data, described below with reference to FIG. 5, is carried out and/or the method for training artificial neural network 306, described with reference to FIG. 6, is carried out.

A method for the evaluation is described below. If a trained model is present, it may be used as an IDS. The sequence of the evaluation at any time increment may be outlined as follows:

receive the message of message type X at instantaneous time increment t.
generate input variable $v_X(t)$.
compute state $s_X = I_X(v_X(t))$.
carry out the aggregation; in the example of the simple concatenation, this is carried out on vector $a = (s_{X1}, \ldots s_{Xn})$ (if $N = \{X_1, \ldots, X_n\}$).
compute all predictions $o_{Xi} = O_{Xi}(a) = v_{Xi}'(t+1)$ for $i \in \{1, \ldots n\}$.
receive message at time increment t+1 (in the example, this may be Y) and compute $v_Y(t+1)$.
determine an anomaly score $f = f(f(t); o_Y; v_Y(t+1); \theta(t))$, where $\theta(t)$ may be further parameters that are included in the anomaly score.

Depending on the application for the IDS, for saving resources it may be meaningful to not compute all predictions $o_{Xi} = O_{Xi}(a) = v_{Xi}'(t+1)$ for $i \in \{1, \ldots n\}$.

Instead, at time increment t it may be awaited until time increment t+1 occurs, and thus, the message type occurs at this point in time, so that it is only necessary to evaluate one target variable.

This model is usable for computing an anomaly score f at any time increment with the aid of output $o_X$. Two approaches are described below by way of example. The anomaly score may be applied in a problem-specific manner.

A first method provides for considering only instantaneous prediction error $e_X(t+1) = \|v_X(t+1) - o_X\|$ in a suitable standard. This means that the true value from network traffic, i.e., input variable $v_X(t+1)$, is compared to prediction $o_X$.

A second method that is more suitable in comparison provides for instantiation of an error memory E, having a starting value 0, for each $X_i \in N$. Each time that a message of message type $X_i$ occurs in the network traffic, associated error memory E(i) is overwritten with instantaneous error value $e_{Xi}$.

An optionally weighted sum of error values E(i) is used as anomaly score f.

When various data channels can be modeled with different degrees of success, in addition statistical approaches may be incorporated into the computation of anomaly score f. Thus, for example, it is possible, based on the normal data, to learn the distributions of the individual errors and estimate the parameters of the associated distribution. For example, the likelihood of the instantaneously observed errors with regard to the computed error distribution may be included in the computation of anomaly score f.

FIG. 5 illustrates steps of a computer-implemented method for classifying data, in particular for the Controller Area Network or the automotive Ethernet network. This method is usable on the one hand in the method for the evaluation. On the other hand, it could also be used to carry out other classifications.

A plurality of messages is received from communications network 108 in a step 502. For example, the makeup of the messages is as illustrated in the CAN trace. The messages do not have to be compiled prior to being fed into the network; the artificial neural network is always provided with a new input variable, for example, when a relevant message type occurs in the message history.

A message of the plurality of messages that has a predefined message type X, for example, CAN ID A, for input variable $v_X$ is selected in a step 504 for input model $I_X$ of artificial neural network 306 that is associated with predefined message type X.

More precisely, a first input variable $v_X$ is selected at a first time increment t. In the example, input model $I_X$ associated with CAN ID A is selected.

Input variable $v_X$ is determined as a function of the message in a step 506. For example, the vector is generated from at least a portion of the data of the message having CAN ID A.

In the example, steps 504 through 506 are carried out for the plurality of messages of message types $X_i$. A plurality of messages from the CAN trace is selected as an input variable for the plurality of input models $I_{X1}, \ldots I_{Xn}$ as a function of the plurality of predefined network types $X_i$, the messages of a certain message type being selected as an input variable for an input model that is unambiguously associated with this message type.

Outputs, for example states $s_{X1}, \ldots s_{Xn}$ of the plurality of input models $I_{X1}, \ldots I_{Xn}$, are aggregated as an input $s_{X1}, \ldots s_{Xn}$, for output area O in an optional step 508. In the example, states $s_{X1}, \ldots s_{Xn}$, as outputs of the plurality of input models $I_{X1}, \ldots, I_{Xn}$, are aggregated to form output a. The aggregation takes place in particular by concatenation of states $s_X$ into the vector or tensor, which in the example represents output a. The above-described aggregation, in particular also the further processing, may be provided additionally or as an alternative.

Prediction $v_Y'$ (t+1) for a classification of the message as a function of input variable $v_X$(t) is output in output area O of the artificial neural network in a step 510. More precisely, a prediction $v_Y'$ t+1) for a second input variable $v_Y$(t+1) is determined as a function of first input variable $v_X$. In the example, the predictions for the plurality of message types $X_i$ are generated from the plurality of output models $O_{X1}, \ldots, O_{Xn}$.

Alternatively or additionally, the artificial neural network is trained to decide, based on at least a portion of network traffic in the communications network, in which state, out of a plurality of possible states, communications network 108 is in with a higher probability compared to the other possible states. In this case, a state of communications network 108 is determined in output area O in step 510.

An anomaly is recognized in a step 512, based on a result of a comparison of second input variable $v_Y$ (t+1) and prediction $v_Y'$ (t+1), when the result satisfies a criterion that defines an anomaly.

For example, the result is defined as a function of the measure for the deviation of prediction $v_Y'$ (t+1) from second input variable $v_Y$(t+1), the criterion being defined by the threshold value for the deviation. In this case, an anomaly is recognized when the measure for the deviation exceeds the threshold value.

A training method for such an artificial neural network is described below. For the sake of simplicity, it is assumed that the plurality of input models $I_{X1}, \ldots, I_{Xn}$ is implemented by simple LSTMs, aggregation area A simply concatenates individual states $s_{X1}, \ldots s_{Xn}$, and each of the plurality of output models $O_{X1}, \ldots O_{Xn}$ is implemented by a simple fully connected artificial neural network.

The training process described below may be very easily transferred to possible variations. The training as schematically illustrated in FIG. 6 may have the following sequence:

set an instantaneous loss L to L=0 in a step 602.
iterate over a predefined number of epochs or until a predefined error measure that is based in particular on validation data is achieved, in a step 604.

select next training data section T from k time increments in a step 606.

All hidden states of all of the plurality of input models $I_{X1}, \ldots, I_{Xn}$ are optionally reset.

A check is made in a step 608 as to whether all training data from training data section T have been used. If training data from training data section T are still present, a step 610 is carried out. Otherwise, step 604 is carried out.

A check is made in a step 610 as to whether a message having message type X occurs in instantaneous time increment t of T. If this is the case, a first input variable $v_X$(t) is determined from the training data.

$s_X = I_X(v_X(t))$ is computed in a step 612.

The aggregation is carried out in a step 614. In the example of simple concatenation, this takes place on vector $a = (s_{X1}, \ldots, s_{Xn})t$ if $N = \{X_1; \ldots; X_n\}$.

A check is made in a step 616 as to whether Y is the message type at time increment t+1. This may be easily checked in the training, based on the CAN trace. If the message type is Y, $o_Y = O_Y(a) = v_Y'$ (t+1) is computed.

A second input variable $v_Y$ (t+1) is determined from the training data in a step 618.

An error measure $F = F(v_Y (t+1); O_Y)$ is determined in a step 620. The mean squared error, for example, may be selected for error measure F; however, the error measure may be applied separately and in a problem-specific manner for each message type. The computed error value is added to instantaneous loss L. A check is made in a step 622 as to whether a predefined number of steps is reached. If this is the case, a backpropagation step is carried out, the parameters of the artificial neural networks are updated according to the optimization strategy, and instantaneous loss L is set to L=0.

Step 608 is subsequently carried out.

One variation of the training process provides that the plurality of input models $I_{X1}, \ldots, I_{Xn}$ aggregate data over multiple time increments, and optionally carry out preprocessing before an evaluation step takes place.

In one variation, multiple time increments are predicted by the plurality of output models $O_{X1}, \ldots O_{Xn}$.

In one variation of the training process, batch optimization may also take place. In particular, for this purpose the gradients that are computed for computing the adaptation of the model parameters are averaged over multiple training data steps before a backpropagation step takes place.

Depending on the problem under consideration, it may be provided to use some of the message types only in input area I but not in output area O, or vice versa.

The presented network architecture and the presented schemes may optionally be easily adapted for training and evaluation in such a way that a reconstruction error is computed instead of the prediction error. At any time increment t, an attempt is made to reconstruct all possible inputs $v_X$(t) instead of prediction $v_Y'$ (t+1). The reconstruction of an input variable is usable for a classification of the message as a function of this input variable. This reconstruction is denoted below by reference symbol $w_X$(t). In the example, the deviation between true input $v_X$(t) and reconstruction $w_X$(t) is used to train the neural network, and to recognize an anomaly in the evaluation phase.

Reconstruction $w_X$(t) of input variable $v_X$(t) that is output is usable, analogously to step 616, for classifying the message as a function of this input variable $v_X$(t). For this purpose, an error measure $F = F(v_X(t); w_X(t))$ is determined, analogously to step 620, as a function of first input variable $v_X$(t) and reconstruction $w_X$(t). A backpropagation step is carried out analogously to step 618, parameters of the artificial neural network being determined according to the optimization strategy as a function of error measure F. Remaining steps 602 through 614 and 622 take place, for example, as described for the prediction.

The schemes presented here for evaluation and training are correspondingly adapted. In particular, the network architecture is adapted according to an autoencoder approach by generating only a single output model that outputs all reconstructions as a vector in concatenated form. In particular, for this purpose a layer whose dimensions are smaller than those of output O is used in the output model.

It is preferably provided that the training takes place without monitoring, in particular only with the aid of data that define normal behavior of communications network 108. The intrusion detection system is configured using only data that describe the normal behavior.

In the method for classification, deviations from this normal behavior are classified as an attack. The system is thus also able to detect unknown attacks.

What is claimed is:

1. A computer-implemented method for classifying data for a communications network, the computer-implemented method comprising the following steps:
receiving a plurality of messages from the communications network;
selecting a message observed at a first time increment that has a predefined first message type for an input variable for a first input model of a plurality of input models of an artificial neural network, the predefined first message type being one of a plurality of different predefined message types, the first input model being associated with the predefined first message type, other input models of the plurality of input models being associated with others of the plurality of different predefined message types;
determining the input variable for the first time increment as a function of the selected message;
outputting, in an output area of the artificial neural network, at least one of: (i) a prediction of at least one of the input variable for a second time increment or a second input variable for the second time increment, the second time increment being later than the first time increment, or (ii) a reconstruction of at least one of the input variable for the first time increment or the second input variable for the first time increment;
comparing at least one of: (a) the prediction to a third input variable based on a second message at the second time increment, or (b) the reconstruction to the input variable or the second input variable for the first time increment; and
determining whether an anomaly is recognized based on whether a result of the comparison satisfies a criterion that defines the anomaly.

2. The computer-implemented method as recited in claim 1, wherein the communications network is a Controller Area Network or an automotive Ethernet network.

3. The computer-implemented method as recited in claim 1, wherein the artificial neural network is trained to allow, as a function of at least a portion of network traffic in the communications network, a decision to be made concerning in which state out of a plurality of possible states the communications network is in with a higher probability compared to the other possible states.

4. The computer-implemented method as recited in claim 1, wherein a plurality of messages is selected as the input variable for the plurality of input models as a function of a plurality of predefined network types, a message type being unambiguously associated with one of the plurality of input models, outputs of the plurality of input models being aggregated as an input for the output area.

5. The computer-implemented method as recited in claim 4, wherein the plurality of input models are recurrent artificial neural networks.

6. The computer-implemented method as recited in claim 4, wherein states of the plurality of input models are aggregated by concatenation of the states into a vector or tensor.

7. The computer-implemented method as recited in claim 1, wherein the anomaly is recognized based on a result of the comparison of the second input variable and the prediction when the result satisfies the criterion that defines the anomaly.

8. The computer-implemented method as recited in claim 7, wherein the result is defined as a function of a measure for a deviation of the prediction from the second input variable, the criterion being defined by a threshold value for the deviation, the anomaly being recognized when the measure for the deviation exceeds the threshold value.

9. The computer-implemented method as recited in claim 1, wherein the input variable based on the selected message is provided to the first input module but not to the other input models.

10. The computer-implemented method as recited in claim 1, where the selecting the message that has the predefined message type is performed by identifying an identifier in the message, the identifier indicating the predefined message type.

11. The computer-implemented method as recited in claim 1, further comprising:
receiving the second message at the second time increment;
determining the third input variable for the second time increment as a function of the second message;
determining an error measure between the prediction and the third input variable; and
classifying the second message as a function of the error measure.

12. The computer-implemented method as recited in claim 1, further comprising:
determining an error measure between the reconstruction and the first input variable; and
classifying the message as a function of the error measure.

13. A device configured to classify data in a communications network, the device comprising:
an artificial neural network, the artificial neural network including a plurality of input models including a first input model for an input variable, and an output area, the first input model being associated with a predefined first message type, other input models of the plurality of input models being associated with others of a plurality of different predefined message types; and
a selection device that is configured to select a message observed at a first time increment from the communications network, the selected message having a predefined first message type, the predefined first message type being one of the plurality of different predefined message types, for the input variable at the first time increment,
wherein the output area is configured to output at least one of: a prediction of the at least one of the input variable at a second time increment or a second input variable at the second time increment, the second time increment being later than the first time increment, or a reconstruction of the at least one of the input variable at the first time increment or the second input variable at the first time increment; and a comparator device configured to compare at least one of: (a) the prediction to a third input variable based on a second message at the second time increment, or (b) the reconstruction to the input variable or the second input variable for the first time increment; and determine whether an anomaly is recognized based on whether a result of the comparison satisfies a criterion that defines the anomaly.

14. The device as recited in claim 13, wherein the artificial neural network is trained to allow, as a function of at least a portion of network traffic in the communications network, a decision to be made concerning in which state out of a plurality of possible states the communications network is in with a higher probability compared to the other possible states.

15. The device as recited in claim 13, further comprising an aggregation section that is configured as an artificial neural network and situated between the plurality of input models and the output area, and is configured to aggregate outputs of the plurality of input models as an input for the output area.

16. The device as recited in claim 15, wherein the plurality of input models are recurrent artificial neural networks.

17. The device as recited in claim 15, wherein the aggregation section is configured to aggregate states of the plurality of input models by concatenation of the states into a vector.

18. The device as recited in claim 13, wherein the comparator recognizes, based on a result of the comparison of the second input variable and the prediction, the anomaly when the result satisfies a criterion that defines an anomaly.

19. The device as recited in claim 18, wherein the result is defined as a function of a measure for a deviation of the prediction from the second input variable, the criterion being defined by a threshold value for the deviation, the device being configured to recognize the anomaly when the measure for the deviation exceeds the threshold value.

20. A training method for an artificial neural network for classifying data for a Controller Area Network or an automotive Ethernet network, using training data that include a plurality of messages of different message types, the training method comprising the following steps:

selecting a message observed at a first time increment having a predefined first message type for a first input variable for an input model of a plurality of input models of an artificial neural network, the predefined first message type being one of a plurality of different predefined message types, the first input model being associated with the predefined first message type, other input models of the plurality of input models being associated with others of the plurality of different predefined message types;

determining the first input variable for the first time increment as a function of the message; one of:

(i)
outputting, in an output area of the artificial neural network, a prediction for a second time increment; determining a second input variable from the training data;
determining an error measure as a function of the second input variable and the prediction; and carrying out a backpropagation step b and determining parameters of the artificial neural network corresponding to an optimization strategy as a function of the error measure, or (ii)
outputting a reconstruction for the first time increment; determining the error measure as a function of the first input variable and the reconstruction; and
carrying out the backpropagation step and determining the parameters of the artificial neural network corresponding to the optimization strategy as a function of the error measure; and determining whether an anomaly is recognized based on whether the error measure satisfies a criterion that defines the anomaly.

21. The training method as recited in claim 20, wherein a plurality of messages is selected as the input variable for the plurality of input models as a function of a plurality of predefined network types, a message type being unambiguously associated with one of the plurality of input models, outputs of the plurality of input models being aggregated as an input for the output area.

22. The training method as recited in claim 21, wherein the plurality of input models are recurrent artificial neural networks.

23. The training method as recited in claim 21, wherein states of the plurality of input models are aggregated by concatenation of the states into a vector or tensor.

24. The training method as recited in claim 20, wherein the first input variable is selected for the first time increment, the prediction for the second input variable being determined for a second time increment as a function of the first input variable, the error measure being determined as a function of the second input variable and the prediction for the second time increment.

25. The training method as recited in claim 20, wherein the plurality of input models aggregate data over multiple time increments, and an evaluation step takes place in the output area with prior preprocessing, the prediction being determined.

26. The training method as recited in claim 20, wherein the first input variable is selected for the first time increment, the reconstruction for the first input variable being determined for the first time increment as a function of the first input variable.

27. The training method as recited in claim 20, wherein the plurality of input models aggregate data over multiple time increments, and an evaluation step takes place in the output area with prior preprocessing, the reconstruction being determined.

28. The training method as recited in claim 20, wherein the training takes place without monitoring and only using data that define normal behavior of the communications network.

29. A non-transitory computer-readable memory on which is stored a computer program for classifying data for communications network, the computer program, when executed by a computer, causing the computer to perform the following steps:

receiving a plurality of messages from the communications network;

selecting a message observed at a first time increment that has a predefined first message type for an input variable for a first input model of a plurality of input models of an artificial neural network, the predefined first message type being one of a plurality of different predefined message types, the first input model being associated with the predefined first message type, other input models of the plurality of input models being associated with others of the plurality of different predefined message types;

determining the input variable for the first time increment as a function of the selected message; and outputting, in an output area of the artificial neural network, at least one of: (i) a prediction of at least one of the input variable for a second time increment or a second input variable for the second time increment, the second time increment being later than the first time increment, or (ii) a reconstruction of the at least one of the input variable for the first time increment or the second input variable for the first time increment;

comparing at least one of: (a) the prediction to a third input variable based on a second message at the second time increment, or (b) the reconstruction to the input variable or the second input variable for the first time increment; and determining whether an anomaly is recognized based on whether a result of the comparison satisfies a criterion that defines the anomaly.

\* \* \* \* \*